United States Patent
Abiko et al.

(10) Patent No.: US 8,031,916 B2
(45) Date of Patent: Oct. 4, 2011

(54) BIOMETRIC INFORMATION INPUT APPARATUS

(75) Inventors: Yukihiro Abiko, Kawasaki (JP); Takashi Shinzaki, Kawasaki (JP); Kiyohiko Ikeda, Kawasaki (JP); Fumie Shiroyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1074 days.

(21) Appl. No.: 11/406,346

(22) Filed: Apr. 19, 2006

(65) Prior Publication Data

US 2007/0160263 A1 Jul. 12, 2007

(30) Foreign Application Priority Data

Jan. 6, 2006 (JP) ................. 2006-001574

(51) Int. Cl.
*G06K 9/00* (2006.01)

(52) U.S. Cl. ........ 382/126; 382/124; 382/125; 382/127; 340/5.53; 340/5.83; 356/71; 713/186; 283/68; 283/69

(58) Field of Classification Search .......... 382/124–127; 340/5.53, 5.83; 356/71; 713/186; 283/68, 283/69

See application file for complete search history.

(56) References Cited

U.S. PATENT DOCUMENTS

| | | | |
|---|---|---|---|
| 5,268,213 A * | 12/1993 | Murakami et al. | 428/163 |
| 6,289,114 B1 | 9/2001 | Mainguet | |
| 6,317,508 B1 | 11/2001 | Kramer et al. | |
| 7,013,030 B2 * | 3/2006 | Wong et al. | 382/124 |
| 2001/0050765 A1 * | 12/2001 | Antonelli et al. | 356/71 |
| 2003/0012417 A1 * | 1/2003 | Hamid | 382/124 |
| 2005/0105782 A1 | 5/2005 | Abiko | |
| 2005/0123177 A1 | 6/2005 | Abiko | |
| 2005/0139685 A1 * | 6/2005 | Kozlay | 235/492 |

FOREIGN PATENT DOCUMENTS

| | | |
|---|---|---|
| JP | 10-091769 | 4/1998 |
| JP | 10-243017 | 9/1998 |
| JP | 11-253428 | 9/1999 |
| JP | 2000-353236 | 12/2000 |
| JP | 2001-197043 | 7/2001 |
| JP | 2002-527832 | 8/2002 |
| JP | 2004-296645 | 10/2004 |
| JP | 2005-143890 | 6/2005 |
| WO | 00/22565 | 4/2000 |
| WO | WO 03075210 A2 * | 9/2003 |
| WO | WO 2004/023999 A1 | 3/2004 |

(Continued)

OTHER PUBLICATIONS

U.S. Appl. No. 11/018,601, filed Dec. 22, 2004, Abiko et al., Fujitsu Limited.

(Continued)

*Primary Examiner* — Bhavesh Mehta
*Assistant Examiner* — Daniel Zeilberger
(74) *Attorney, Agent, or Firm* — Staas & Halsey LLP

(57) ABSTRACT

The biometric information input apparatus comprises a fingerprint sensor which detects biometric information, and moisture absorbing units and which are arranged adjacent to the fingerprint sensor and absorb moisture. The moisture absorbing units and have a groove structure which generates a capillary phenomenon. The fingerprint sensor is of the sweep type which scans biometric information through relative displacement with the finger, and is formed in parallel with the direction of relative displacement between the groove structure and the finger. The groove structure has a width smaller than the pitch of the ridges of an average fingerprint.

6 Claims, 15 Drawing Sheets

FOREIGN PATENT DOCUMENTS

| | | |
|---|---|---|
| WO | WO 2004/026139 A1 | 4/2004 |
| WO | WO 2004070645 A2 * | 8/2004 |
| WO | WO 2004/102481 A1 | 11/2004 |

OTHER PUBLICATIONS

U.S. Appl. No. 11/082,137, filed Mar. 17, 2005, Abiko et al., Fujitsu Limited.

Japanese Office Action issued Jun. 22, 2010 in corresponding Japanese Patent Application 2005-361340.

Japanese Patent Office Notification of Reasons of Refusal mailed Jan. 25, 2011 for corresponding Japanese Patent Application No. 2006-001574.

* cited by examiner

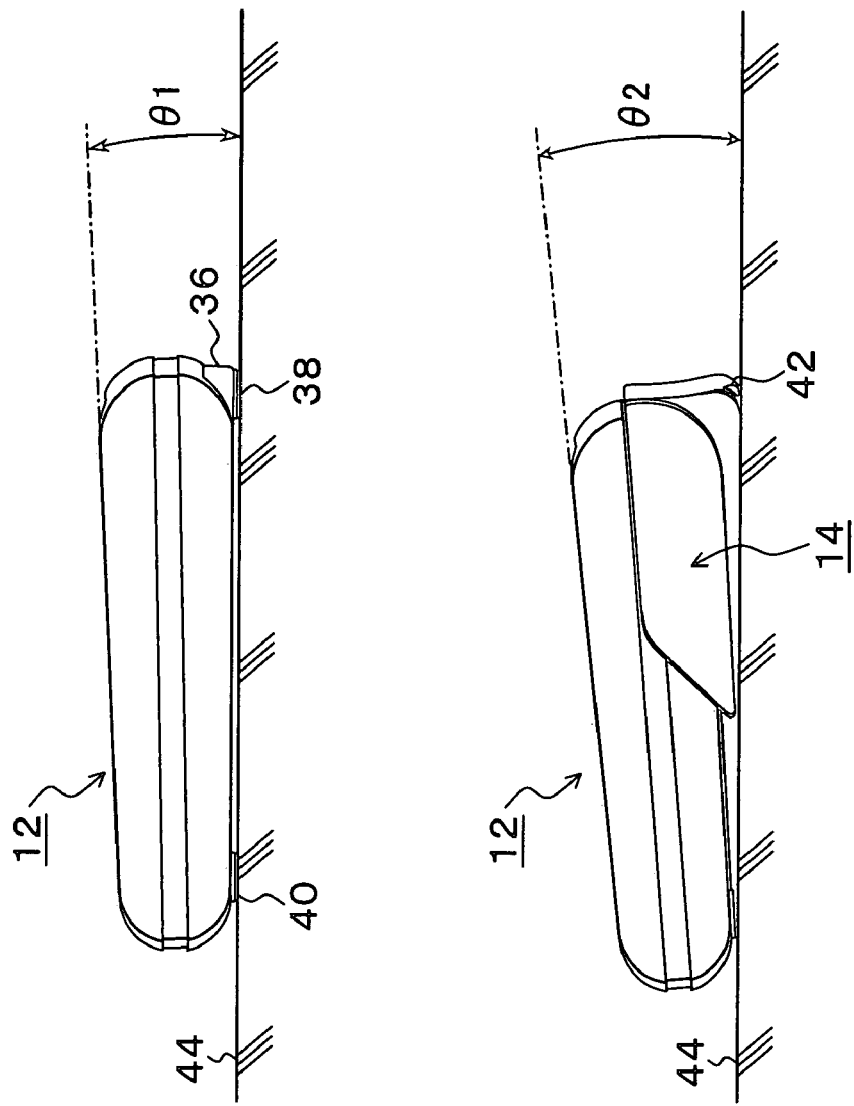

BIOMETRIC INFORMATION INPUT APPARATUS

This application is a priority based on prior application No. JP2006-001574 filed Jan. 6, 2006 in Japan.

BACKGROUND OF THE INVENTION

1. Field of the Invention

The present invention relates to a biometric information input apparatus for conducting personal authentication or pointing by the use of biometric information such as a fingerprint or a palmprint. More particularly, the invention relates to a biometric information input apparatus of the sweep type for entering biometric information while causing a relative displacement of a living body.

2. Description of the Related Art

Along with the recent tendency toward higher functions, compact information devices such as cell phones and PDAs (Personal Digital Assistants), it is now possible for these devices to be connected to systems or to store a huge volume of personal information, and there is an increasing demand for a higher security performance in these devices.

In order to ensure a high security in these devices, personal authentication based on biometric information has a high reliability and can satisfy the above-mentioned increasing demand. Particularly, use of fingerprint as biometric information can provide a high serviceability.

When carrying out personal authentication by use of fingerprint as biometric information, fingerprints are sampled as image information from fingers of the person to be authenticated (a pattern composed of ridges which can be in contact with the sampling surface of the fingerprint sensor and valleys not coming into contact with the sampling surface). Positional information of bifurcations and ridge endings is extracted as feature information from, for example, a ridge image of the fingerprint image, and personal authentication which determines whether or not the person to be authenticated is the person in question is accomplished by matching the thus extracted feature information with registered feature information of the person to be authenticated registered in advance.

As a fingerprint sensor downsized for mounting on a compact information device such as a cell phone or a PDA, there is known a sweep-type (scanning type) fingerprint sensor (Re: J P 10-091769, JP 11-253428 and JP 2005-143890). The sweep-type fingerprint sensor has a rectangular detecting surface which is sufficiently smaller in length than the finger length and has a small area) (sensor area/pickup surface). A plurality of partial images of fingerprints are continuously sampled by means of the fingerprint sensor while moving the detecting surface (fingerprint sensor) relative to the fingers, and a whole view of fingerprint images is re-configured from the sampled plurality of partial images.

Information of minutiae (bifurcations of ridge, ridge endings, etc.) is extracted and generated from the thus re-configured fingerprint image, and the above-mentioned personal authentication is accomplished on the basis of this information.

Available related patent documents are as follows:

In such a conventional sweep-type fingerprint sensor, however, scanning may sometimes be carried out in a wetted state of finger, with, for example, fingers having drops of water caused by sweat, depending upon the environment or circumstances of use. Such a case leads to a problem in that sweat or water drops are picked up in the fingerprint image, and finger displacement causes generation of a string-shaped pattern, thus deteriorating authenticating performance as noise when conducting a personal authentication.

More specifically, when scanning a wetted finger by a sweep type fingerprint sensor, moisture held between the finger and the sensor is entangled by the moving finger or sweat adheres to the sensor while the finger moves, resulting in a longitudinal string-shaped image pattern in the fingerprint image. This longitudinal string-shaped image pattern is low in reproducibility, or has not relationship with the fingerprint pattern at all, forms noise in the case of personal authentication and degrades the authenticating performance.

This noise of image pattern caused by a wetted finger can be inhibited or removed through image processing, but implementation of such an image processing requires much time and labor for research and development, and further for industrialization, thus leading to the problem of an inevitable increase in cost.

SUMMARY OF THE INVENTION

According to the present invention, there is provided a biometric information input apparatus which makes it possible to obtain a satisfactory fingerprint image containing little noise even from a wetted finger at a low cost.

The present invention provides a biometric information input apparatus. The biometric information input apparatus of the present invention comprises a biometric information detecting unit which detects biometric information and a moisture absorbing unit which is arranged adjacent to the biometric information detecting unit and absorbs moisture.

The moisture absorbing unit has a groove structure. The moisture absorbing unit has a structure which generates a capillary phenomenon.

The biometric information detecting unit scans biometric information through a relative displacement with a living body (sweep type), and a groove structure is formed in parallel with the direction of the above-mentioned relative displacement.

The biometric information to be acquired by the biometric information detecting unit is a fingerprint. The groove width of the groove structure is smaller than the average ridge pitch. The groove structure has a groove width smaller than 0.2 mm. The groove depth of the groove structure is smaller than 0.04 mm. The moisture absorbing unit may be made of fiber.

In the biometric information input apparatus of the present invention, a protecting cap detachable from the apparatus main body having a biometric information detecting unit and the moisture absorbing unit is further provided. The protecting cap, when attached to the upper side of the apparatus main body, covers the biometric information detecting unit, and when attached to the bottom side of the apparatus main body, has an angle adjusting structure which increases the inclination angle of the detecting surface of the biometric information detecting unit by a prescribed angle.

The apparatus main body has a shape which vertically symmetric, and has a guide groove engaging with the protecting cap formed at the center of the side surface thereof.

In the biometric information detecting unit, frame grounding electrodes for grounding the living body in contact are arranged before and after the detecting surface. A pair of frame grounding electrodes are arranged at a position higher than the detecting surface. The frame grounding electrodes have a marker shape which indicates the direction of displacement of the living body relative to the detection surface.

The groove structure may have a shape in which V-shaped groove patterns are continuously formed in the relative displacement direction, or diamond lattice groove patterns are continuously formed with the direction of relative displacement as the longitudinal direction.

According to the present invention, it is possible to reduce noise and obtain satisfactory biometric information by removing moisture which is a cause of noise in biometric information through absorption by means of the moisture absorbing unit, and thus improve authenticating performance in personal authentication.

The moisture absorbing unit formed into a groove structure makes it possible to perform fabrication using a mold, and thus to reduce the manufacturing cost for achieving the groove structure.

By achieving the moisture absorbing unit by use of the capillary phenomenon, the human body never suffers from a burn as in heat generation caused by the chemical reaction upon absorbing moisture as typically represented by silica gel, and moisture can safely be absorbed and removed from the living body.

In the present invention, the direction of relative displacement of the living body can be kept constant by forming the groove structure in parallel with the relative displacement direction. This furthermore leads to a constant distortion and a constant direction of relative displacement of the living body, and the manner of distortion thus kept constant permits efficient calculation of the direction of displacement and the distance of displacement of the living body by means of the detected biometric information.

By using a width of the groove structure smaller than the ridge pitch, pressing of the living body onto the grooves leaves no imprint of ridges and valleys of grooves in the living body, thus enabling to inhibit lack of biometric information detected by the biometric information detecting unit.

Adoption of a width of the groove structure smaller than 0.2 mm, the average ridge pitch eliminates imprints of the grooves produced upon pressing the living body against the grooves, and omission of biometric information detected by the biometric information detecting unit.

Use of a depth of the groove structure smaller than 0.04 mm makes it possible to easily wipe off stains adhering to the grooves.

By using a structure made of fiber such as cloth as the moisture absorbing unit, it is possible to absorb and remove moisture from the living body because of the high moisture absorbability.

In the present invention, an appropriate degree of contact of the finger to be scanned with the detection surface is achievable and a satisfactory biometrics image is available by providing a protecting cap detachable from the apparatus main body, and attaching the protecting cap to the bottom side of the apparatus main body to increase the angle of inclination of the slant by a prescribed angle.

In the present invention, frame grounding electrodes are arranged at a position higher than the detection surface to permit easy coming into contact with the living body for the purpose of preventing occurrence of a damage to the biometric information detecting unit caused by electrostatic discharge. The frame grounding electrodes are arranged before and after the detection surface. This eliminates the need for frame grounding electrodes conventionally arranged around the detection surface, thus allowing downsizing. The frame grounding electrodes take a form of a marker indicating the direction of displacement of the living body, thus improving convenience.

The above and other objects, features, and advantages of the present invention will become more apparent from the following detailed description with reference to the drawings.

BRIEF DESCRIPTION OF THE DRAWINGS

FIGS. 6A and 6B are descriptive views of the installation angle of the apparatus main body alone and the installation angle in a state in which the protecting cap is attached;

DETAILED DESCRIPTION OF THE PREFERRED EMBODIMENTS

Figure 1:
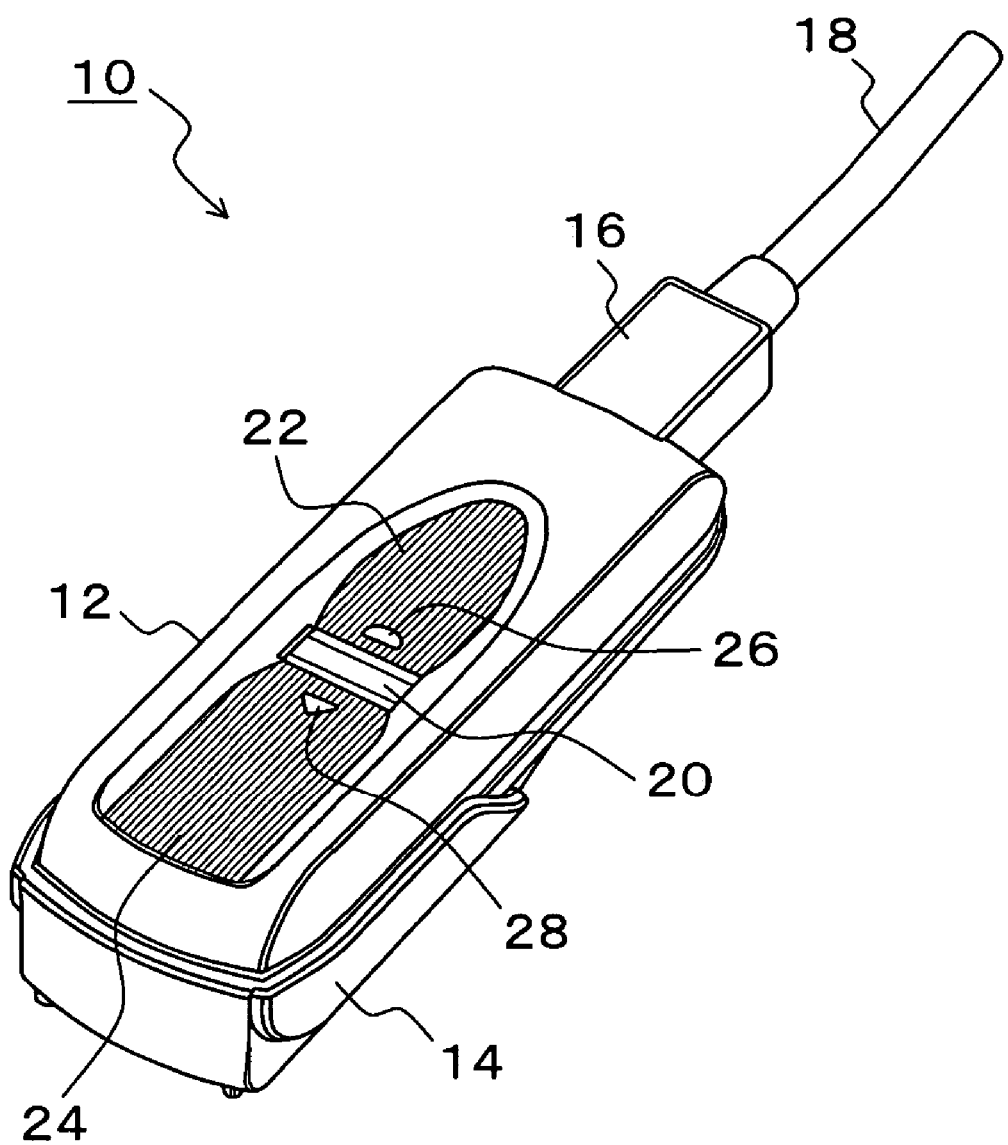
FIG. 1 is a descriptive view of an embodiment of the biometric information input apparatus of the present invention.

FIG. 1 is a descriptive view of an embodiment of the biometric information input apparatus of the present invention. This embodiment presents a case where a fingerprint is entered as biometric information. In FIG. 1, the biometric information input apparatus 10 is composed of an apparatus main body 12 and a protecting cap 14. The protecting cap 14 is provided detachably from the apparatus main body 12. The apparatus main body 12 connected to a cable 18 via a USB plug 16, and is used by connecting via the cable 18 the biometric information input apparatus 10 to a processor such as a personal computer. A fingerprint sensor 20 is arranged on the upper surface of the apparatus main body 12. The fingerprint sensor 20 is to obtain a biometric information image on a two-dimensional array, i.e., a finger print image, by moving the finger relative to the detection surface. Applicable detection methods include electrolytic, electrostatic capacitance, thermal and optical methods. Displacement of the finger as compared with the fingerprint sensor 20 is relative: the finger may move or the fingerprint sensor 20 may be moved. The moisture absorbing units 22 and 24 are arranged before and after the fingerprint sensor 20. The moisture absorbing units 22 and 24 are arranged adjacent to the fingerprint sensor 20 so that, when causing the portion of finger to slide on the detection surface, the portion of finger comes into contact first with the moisture absorbing unit 22, and then with the detection surface of the fingerprint sensor 20. In this embodiment, the moisture absorbing units 22 and 24 are arranged adjacent to each other with the fingerprint sensor 20 in between. The moisture absorbing units may however be provided in a place at a position where they are in touch with the finger before it comes into contact with the detection surface, or the moisture absorbing units may be provided so as to surround the fingerprint sensor 20. The moisture absorbing unit 22 has a groove structure having longitudinal stripe groove patterns in parallel with the finger displacement direction relative to the fingerprint sensor 20. When drops of water such as sweat adhere to the surface of the finger, for example, pressing the finger against the moisture absorbing unit 22 pushes off the moisture into the groove structure of the moisture absorbing unit 22, and at the same time, because of the narrow width of the groove structure, capillary phenomenon sucks out the moisture of the finger into the groove structure. At the position where the moisture absorbing units 22 and 24 are arranged before and after the fingerprint sensor 20, frame grounding electrodes 26 and 28 are provided. The frame grounding electrodes 26 and 28 have the grounding function for matching the fingerprint sensor 20 with the finger in grounding level upon coming into contact with the finger, so as to prevent breakage of the fingerprint sensor 20 caused by static electricity of the human body. In the case of a conventional fingerprint sensor, frame grounding electrodes have been provided around the detection surface. In this embodiment, however, the frame grounding electrodes are provided separately before and after the finger sliding on the fingerprint sensor 20. The frame grounding electrode 28 has a triangular shape to show the operating direction of the finger so as to be capable of guiding the finger in the displacement direction.

Figure 2:
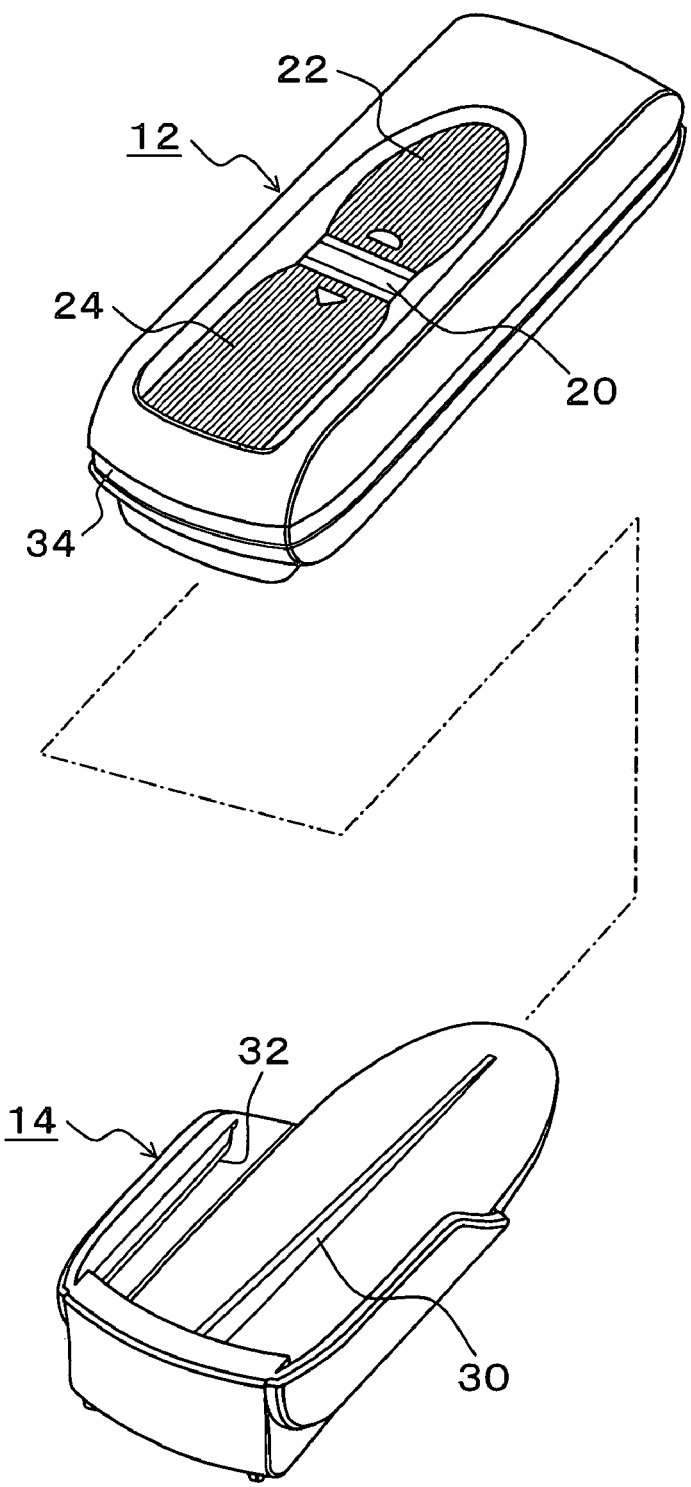
FIG. 2 is a descriptive view of a state in which the protecting cap is removed from the apparatus main body in the case shown in FIG. 1.

FIG. 2 is a descriptive view of the state in which the protecting cap 14 is removed from the apparatus main body 12. In FIG. 2, the protecting cap 14 has a structure detachably attached to the upper or lower part of the operator's side of the apparatus main body 12, and has an angle adjusting fin 30 standing upright on the bottom and a guide fin 32 standing upright on the side surface. The apparatus main body 12 has a guide groove 34 formed on the side surface thereof. By fitting the guide fin 32 of the protecting cap 14 into the guide groove 34, the protecting cap 14 is attached onto the bottom side of the apparatus main body 12 as shown in FIG. 1. In this case, the protecting cap 14 serves as a wedge-shaped spacer, so that the indication angle of the operating surface having the fingerprint sensor 20 installed on the installation surface of the apparatus main body 12 can be increased by a prescribed angle.

Figure 3:
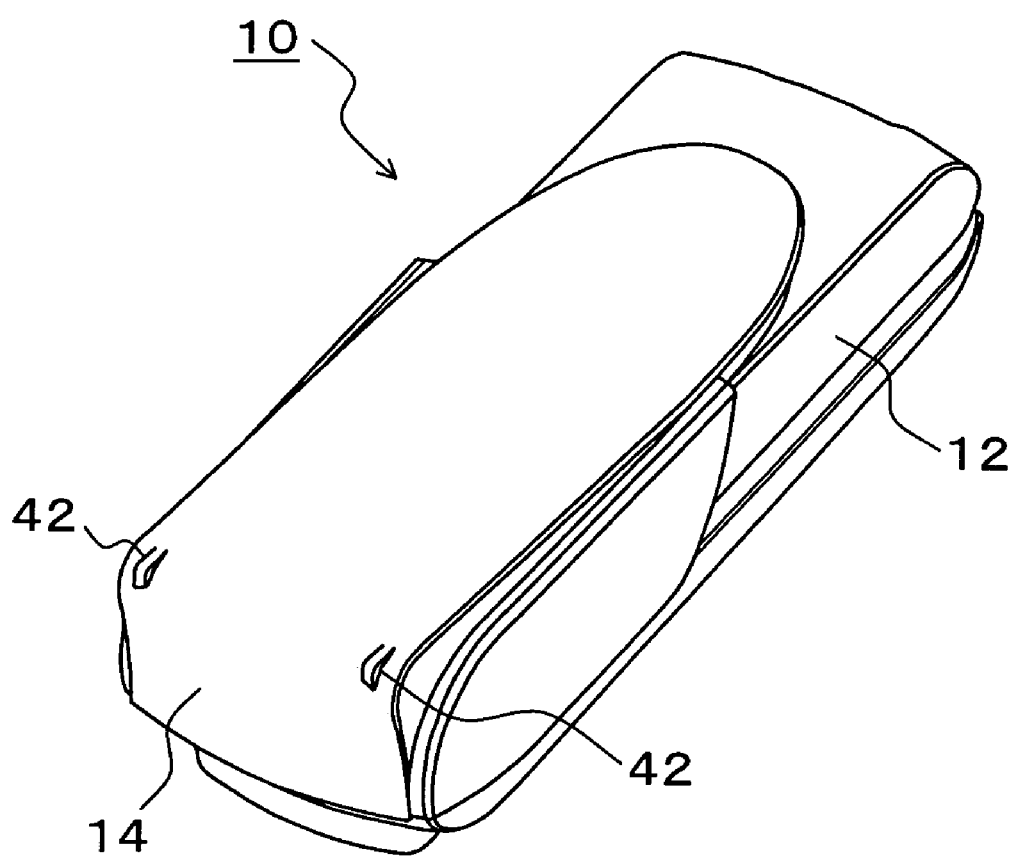
FIG. 3 is a descriptive view of a state in which the protecting cap is installed on the upper part of the apparatus main body.

The protecting cap 14 has a function of protecting the fingerprint sensor 20 of the apparatus main body 12 from an external impact. When the biometric information input apparatus 10 is not in service, the portion of the fingerprint sensor 20 of the apparatus main body 12 is covered by the protecting cap 14 for protection by fitting the guide fin 32 thereof into the apparatus main body 12 by turning it over as shown in FIG. 3. As is evident from the state of attachment of the protecting cap 14 shown in FIG. 3, leg units 42 are provided at corners of the bottom of the protecting cap 14, so as to ensure that the protecting cap 14 is secured on the installation surface of a desk or the like against pushing or displacement of the finger to the fingerprint sensor 20, when the leg units 42 are attached as wedge-shaped spacers to the apparatus main body 12 as shown in FIG. 1.

Figure 4A:
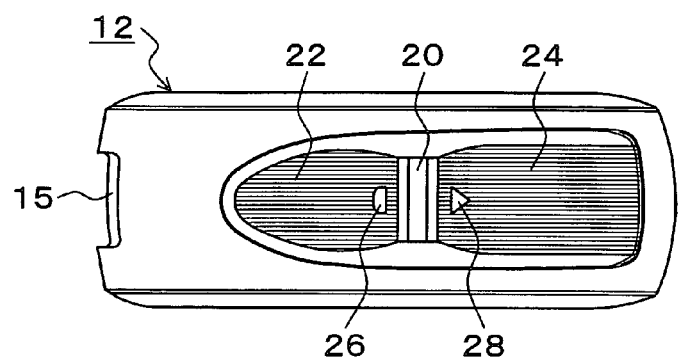
FIGS. 4A to 4C are descriptive views in a top plan view, a side plan view and a bottom plan view of the apparatus main body.
Figure 4B:
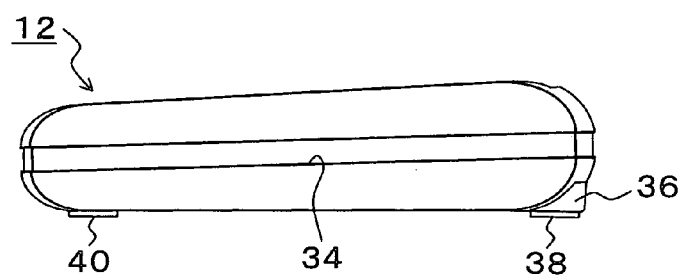
Figure 4C:
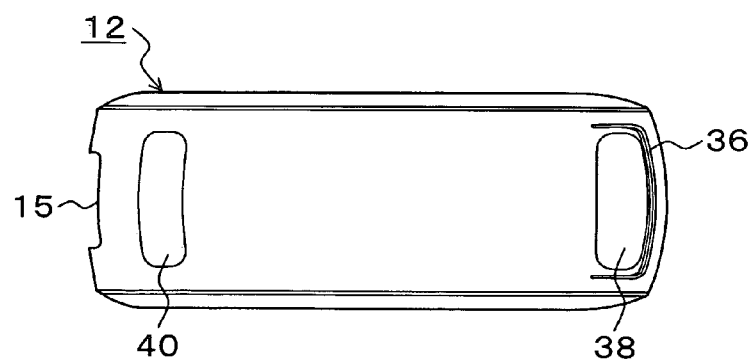

FIGS. 4A to 4C are descriptive views of the apparatus main body 12 in this embodiment in a top plan view, a side plan view and a bottom plan view. In FIGS. 4A to 4C, the apparatus main body 12 has the moisture absorbing units 22 and 24 formed at positions on the upper surface thereof before and after the fingerprint sensor 20 as shown in FIG. 1. Simultaneously, frame grounding electrodes 26 and 28 are arranged separately at positions before and after the fingerprint sensor 20. The frame grounding electrodes 26 and 28 are arranged to form a triangular shape indicating the operating direction of the finger so as to permit guidance of the finger in the direction of displacement. Furthermore, a connector 15 connected to the USB plug 16 shown in FIG. 1 is provided on the left side surface of the apparatus main body 12. The apparatus main body 12 has a guide groove 34 for attaching the protecting cap 14 on the side surface formed thereon as shown in FIG. 4B. In order that the protecting cap 14 is made capable of being detachably attached to the guide groove 34 on the upper or bottom side with top side down, the side surface of the apparatus main body 12 has a vertically symmetric shape. As shown in FIG. 4C, a leg unit 36 is provided at an end of the bottom of the apparatus main body 12, and a rubber pad 38 is attached to the bottom of the leg unit 36 for preventing slippage. A rubber pad 40 for preventing slippage is attached also to the bottom on the side opposite to the leg unit 36.

Figure 5A:
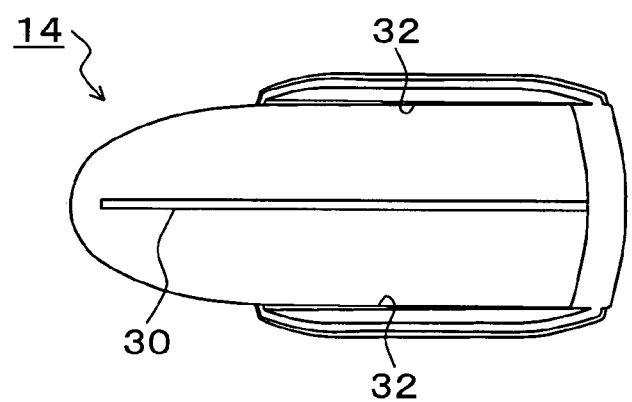
FIGS. 5A and 5B are descriptive views in a top plan view and a side plan view of the protecting cap.
Figure 5B:
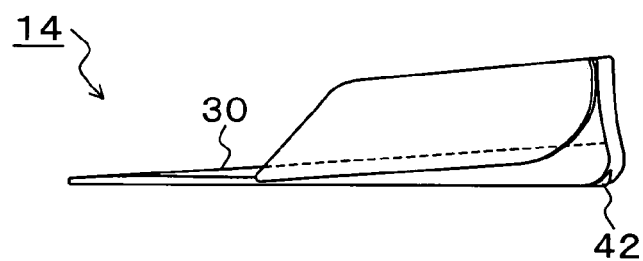

FIGS. 5A and 5B are descriptive views of the protecting cap 14 in this embodiment in a top plan view and a side plan view. In FIGS. 5A and 5B, the protecting cap 14 has an angle adjusting fin 30 standing upright at the center of the bottom, and a guide fin 32 standing upright on the inside of the side surface. A rubber pad is attached for preventing slippage to the bottom of the protecting cap 14. This rubber pad may be pasted to the entire bottom surface, or may have the same shape as that of the rubber pads 38 and 40 for the apparatus main body 12. The protecting cap 14 may be made of a material having a high frictional coefficient such as elastomer.

Figure 7A:
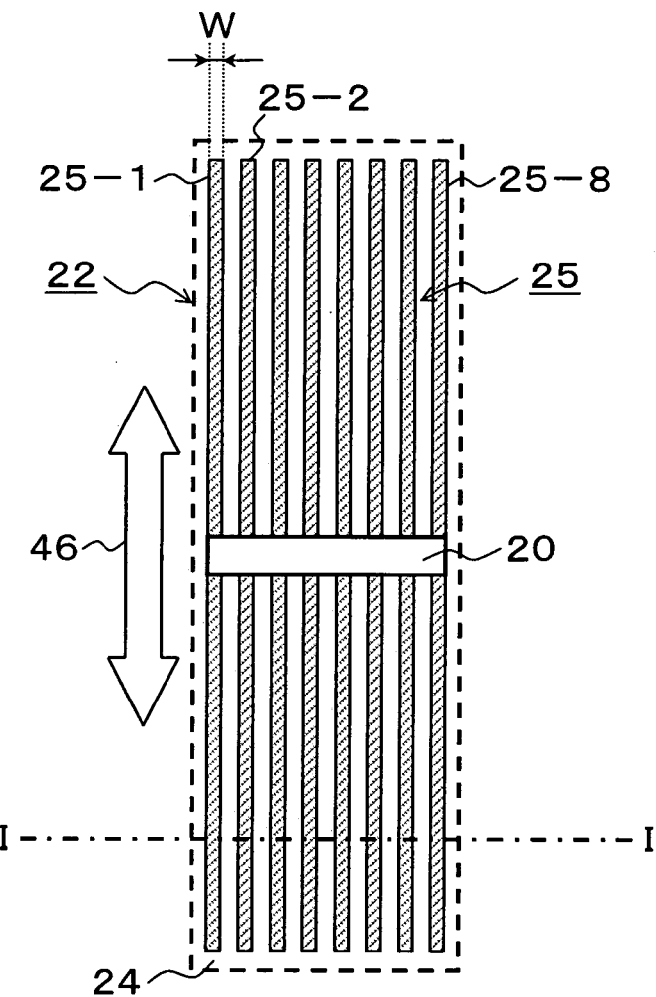
FIGS. 7A and 7B are descriptive views showing details of the moisture absorbing unit installed on the apparatus main body.
Figure 7B:
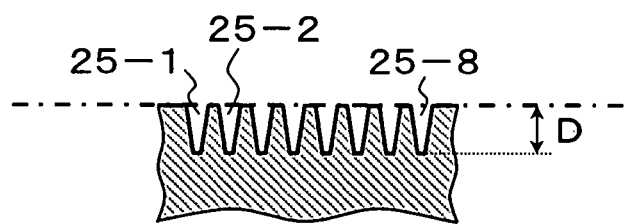

FIGS. 6A and 6B are descriptive views of the installation angle of the apparatus main body used stand-alone and the installation angle upon attaching the protecting cap. FIG. 6A covers a case where the apparatus main body 12 is simply placed on a installation surface such as a desk. The rubber pad 38 of the leg unit 36 and the rubber pad 40 on the opposite side are positions in contact with the installation surface 44. In this case, the upper surface holding the fingerprint sensor 20 installed thereon has an inclination angle θ1 of 3°. FIG. 6B covers a case where the protecting cap 14 is attached as a wedge-shaped spacer to the apparatus main body. As a result of attachment of the protecting cap 14, and upper surface holding the fingerprint sensor 20 of the apparatus main body 12 installed thereon has an inclination angle θ2 of 7°, representing an increase of 4° as compared with that in the case of the apparatus main body 12 alone shown in FIGS. 6A and 6B. This increase in the inclination angle permits appropriate pressing upon displacement of the finger relative to the detection surface of the fingerprint sensor 20. More specifically, upon increase in the inclination angle, the inclined detection surface relative to the horizontal displacement of the finger receives the finger, this resulting in an increase in the pressing force of the finger against the detection surface. Appropriate pressing of the fingerprint against the inclined surface of the fingerprint sensor 20 makes it possible to obtain a clear fingerprint image. By causing the inclination angle to agree with the angle formed by the installation surface such as a desk and the finger, the entire finger print comes into contact with the detection surface of the fingerprint sensor 20. FIGS. 7A and 7B are descriptive views illustrating the details of the moisture absorbing units 22 and 24 installed on the apparatus main body 12 of this embodiment. In FIG. 7A, the moisture absorbing units 22 and 24 are arranged before and after the fingerprint sensor 20 and have a groove structure with longitudinal stripe groove patterns in which the grooves 25-1, 25-2, . . . , 25-8 are arranged in parallel with the displacement direction 46. To simplify description, the grooves 25-1 to 25-8 are illustrated with widths slightly larger than the actual ones. Each of the grooves 25-1 to 25-8 having the longitudinal strip groove pattern provided in the moisture absorbing units 22 and 24 has a groove width W, a trapezoidal cross-section having a depth D for example as shown in FIG. 7B illustrating an I-I cross-section.

Figure 8:
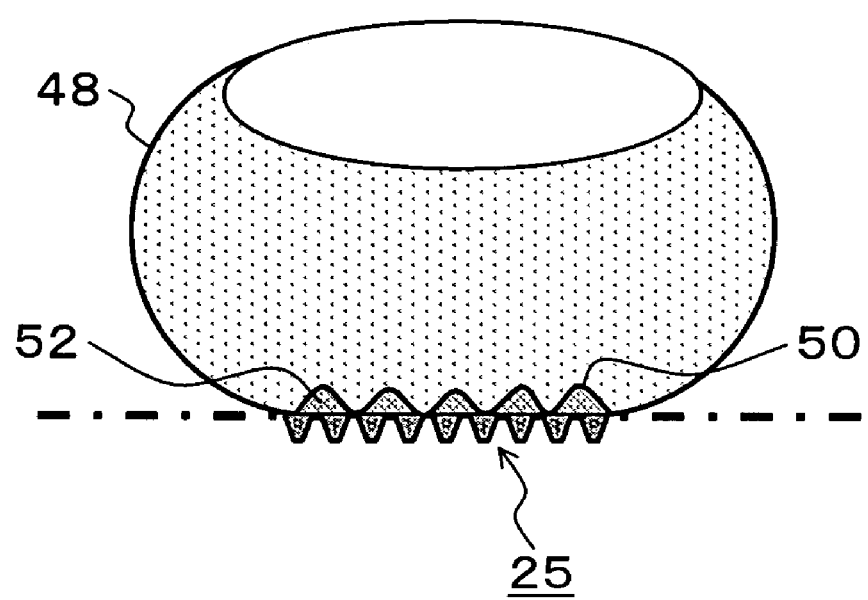
FIG. 8 is a descriptive view of the effect brought about by the vertical stripe groove pattern of removing moisture from wetted fingertip.

FIG. 8 is a descriptive view of the operation of removing moisture from a wetted fingertip by the longitudinal stripe groove pattern shown in FIGS. 7A and 7B. In FIG. 8, when moisture 52 such as sweat adheres to the surface of a finger 48, the moisture 52 held between the finger 48 and the concavities of the groove structure is pushed out into troughs of the fingerprint in the finger 48 and the concavities of the groove structure by pressing the finger 48 against the groove structure of the longitudinal stripe groove pattern 25. In the absence of the groove structure, the moisture 52 would gather into the troughs of the fingerprint. Presence of the groove structure in contrast makes it possible to reduce the amount of moisture 52 on the outer layer of the skin of the finger 48. The groove width of the groove structure of the longitudinal stripe groove pattern is so small that capillary phenomenon causes the moisture 52 accumulated in the troughs of the finger 48 to be sucked out into groove portions of the longitudinal stripe groove pattern 25, thus permitting reduction of moisture 25 of the finger 48. Moisture of the finger is thus sucked out by the capillary phenomenon resulting from the groove structure. Therefore, as compared with a case where an adsorbent generating heat by adsorbing moisture such as silica gel is used, no adverse effect such as burn is exerted on the human body.

Referring again to FIGS. 7A and 7B, the longitudinal stripe groove pattern provided in the moisture absorbing units 22 and 24 displays a guiding effect for guiding and scanning appropriately the fingertip relative to the fingerprint sensor 20 in addition to the moisture absorbing effect. That is, when scanning a fingerprint image through relative displacement of a finger relative to the fingerprint sensor 20, drawing of an arch or a zigzag by the fingertip by the displacement of fingertip causes a considerable change in distortion of the surface skin as a result of friction taking place between the finger and the biometric information input apparatus caused by elasticity of the finger surface skin, and the read fingerprint is not suitable for authentication. In this embodiment, it is possible to guide the finger in the direction of displacement 46 by providing the groove structure based on the longitudinal stripe groove pattern 25 as the moisture absorbing units 22 and 24. When there are portions called ridges in the surface skin bulging from surroundings as in fingerprint, these ridges engage with convex and concave portions of the groove structure of the longitudinal stripe groove pattern 25 provided in the moisture absorbing units 22 and 24. Compare a case where the finger is displaced in a direction in parallel with the grooves and a case where the finger is displaced in a direction perpendicular to the grooves. If the finger is displaced in the perpendicular direction, the ridges of fingerprint are caught by the convex portions of the grooves, resulting in an increase in resistance and making it difficult to displace the finger. When the finger is displaced in parallel with the grooves, in contrast, movement of the ridges long the grooves leads to a smaller resistance and an easier displacement. As a result, the groove structure of the longitudinal stripe groove pattern 25 composing the moisture absorbing units 22 and 24 can take the role of a guide for arranging the displacement of the finger in a certain direction.

Figure 9A:
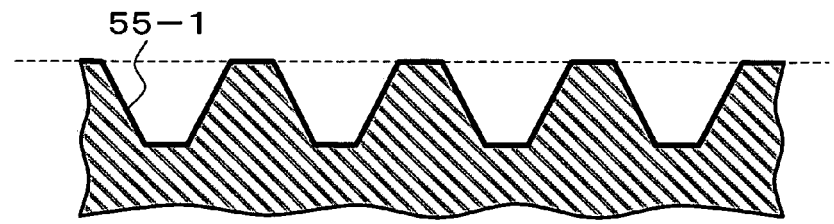
FIGS. 9A to 9D are sectional views of the groove used in the moisture absorbing unit of this embodiment.
Figure 9B:
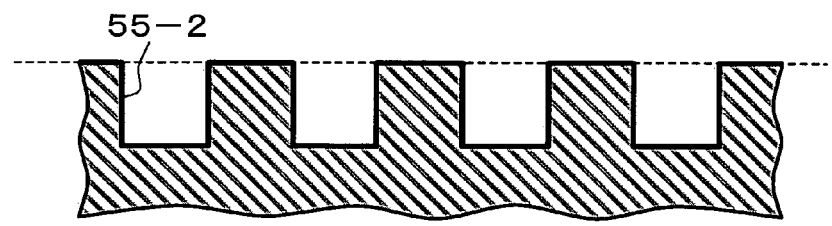
Figure 9C:
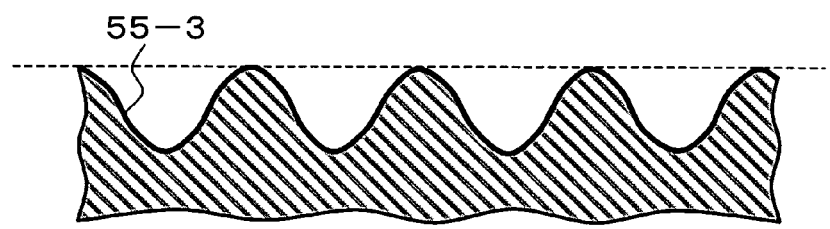
Figure 9D:
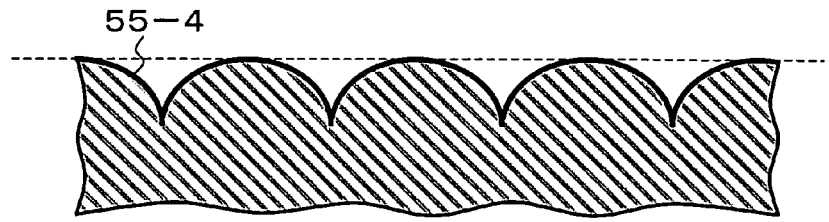

FIGS. 9A to 9D are sectional views of groove used for the moisture absorbing units 22 and 24 of this embodiment. The trapezoidal groove 55-1 shown in FIG. 9A is the one shown in FIGS. 7A and 7B. The shape of groove may be a rectangular groove 55-2 shown in FIG. 9B, a wavy groove 55-3 shown in FIG. 9C, or a curled groove 55-4 shown in FIG. 9D.

The groove sectional shape used for the groove structure in the present invention may be determined in view of the balance between relative difficulty of fabrication when forming in a die and the effect of guiding the fingertip. In this embodiment, the trapezoidal groove 55-1 shown in FIG. 9A is adopted as the most suitable groove sectional shape which satisfies both conditions of easy fabrication and guiding effect. The width and the depth of groove in the longitudinal stripe groove pattern provided in the moisture absorbing units 22 and 24 of this embodiment will now be described.

Figure 10A:
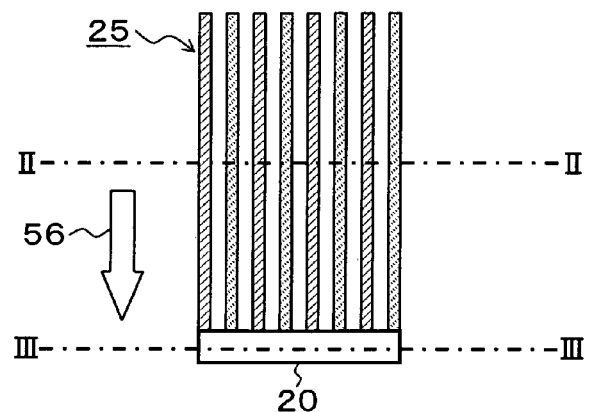
FIGS. 10A to 10C are descriptive views illustrating skin deformation caused by the displacement of finger when the groove width is wide.
Figure 10B:
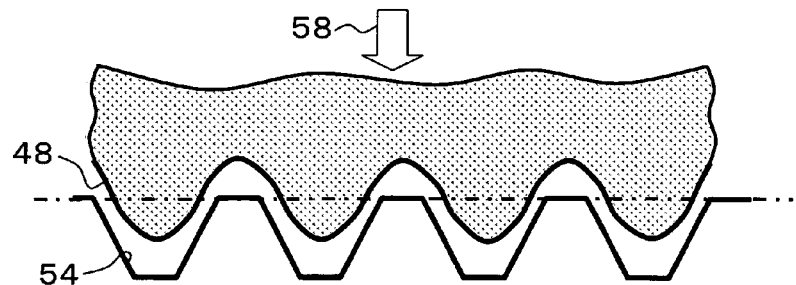
Figure 10C:
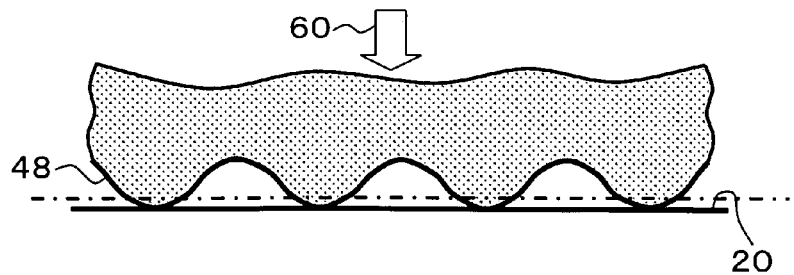

FIGS. 10A to 10C represent the groove structure resulting from the finger operation when a larger groove width is adopted in the longitudinal stripe groove pattern 25, and the state of surface skin on the detection surface of the fingerprint sensor 20. Fingers of which the fingerprints are to be entered have elasticity. When a fingertip is pressed against convex and concave portions as in the longitudinal stripe groove pattern, the surface skin of the fingertip deforms in response to the convex and concave portions of the grooves, and it takes some time for the deformed fingertip to recover the original state. For example, in a case where a finger is displaced while pressing it against a trapezoidal grooves 54 as shown in FIG. 10B, and immediately thereafter a fingerprint image is detected by the fingerprint sensor 20, if the trapezoidal grooves 54 have a wide width W, the surface skin of the finger 48 penetrates deep into the grooves 54 and deforms, and convex and concave portions are deeper on the finger side by pressing the finger against the grooves 54 under a load 58. When the finger is displaced on the detection surface of the fingerprint sensor 20 as shown in FIG. 10C, application of a load 60 destroys convex and concave portions of the surface skin of the finger 48. When the convex and concave portions on the finger side are deep, these portions do not recover the original state during passage on the detection surface of the fingerprint sensor 20, and the convex and concave portions are left as they are. If convex and concave portions are thus left on the finger side, ridges at concave portions of the fingerprint do not come into contact with the detection surface of the fingerprint sensor 20 and the images of the ridges are not displayed, thus preventing a clear fingerprint image from being obtained.

Figure 11A:
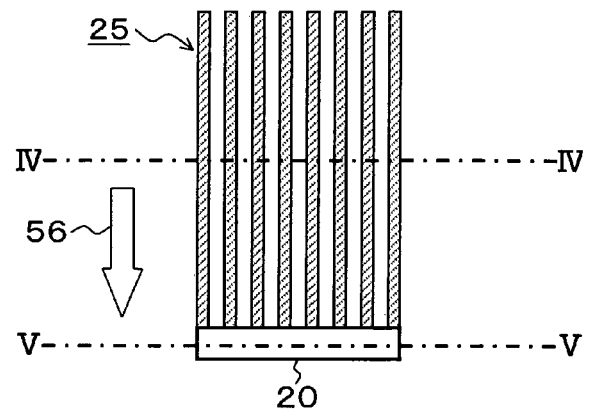
FIGS. 11A to 11C are descriptive views illustrating skin deformation caused by the displacement of finger when the groove width is narrow.
Figure 11B:
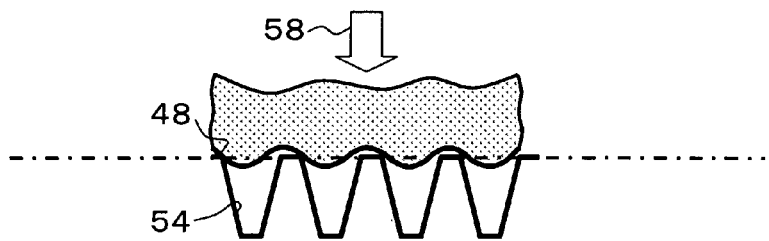
Figure 11C:
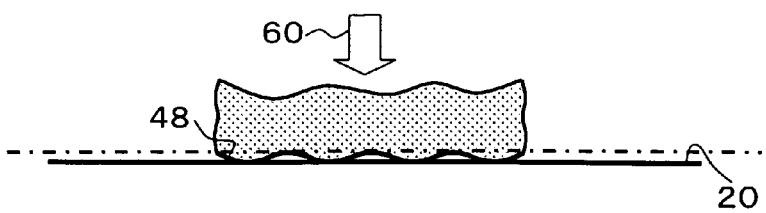

In a case where the groove width in the longitudinal stripe groove pattern is reduced as that of the groove 25 shown in FIG. 11 B as in FIG. 11 A, convex and concave portions of the surface skin 48 upon pressing the finger in the direction of the load 58 becomes shallower, and when the finger is moved to the fingerprint sensor 20, application of the load 60 as in FIG. 11C causes the convex and concave portions of the surface skin 48 of the finger resulting from the grooves to be crushed and the original state is almost recovered. That is, if the width of the grooves 54 is smaller than the ridge width of the fingerprint, impressions of the convex and concave portions resulting from pressing of the finger against the grooves 54 hardly remain. Even when impressions of convex and concave portions remain, the load 60 during displacement on the detection surface of the fingerprint sensor 20 crushes the convex and concave portions and the original state is recovered. Furthermore, even if there are portions of which images are not displayed because the ridges of concave portions on the finger side are not in contact with the fingerprint sensor 20, ridges of the convex portions reliably come into contact with the detection surface of the fingerprint sensor 20 and are displayed around the portions not displayed. It is therefore easy to interpolate the presence of ridges of concave portions on the finger side of the lacking portions and thus to make image corrections. An average ridge width in fingerprints of 0.2 mm is reported (D-II, Vol. J72-D-II, No. 5, pp. 724-737, 198 published in May 1989). In view of the fact that the average ridge width is 0.2 mm, the groove width W of the groove structure in this embodiment should be smaller than 0.2 mm. In this case, because the standard deviation is 0.03 mm, the groove width should preferably be smaller than 0.16 mm taking into account the dispersion. On the other hand, when, in the biometric information input apparatus, moisture absorbing units 22 and 24 having a groove structure are arranged before and after the fingerprint sensor 20 in contact with the finger, stains such as fine dust or sebum adhere and penetrates into concave portions of the groove structure. In deep groves, it is difficult to remove stains having penetrated into the grooves. In this embodiment, therefore, stains of the grooves can be properly eliminated by means of an easily available material such as tissue paper, and a groove depth smaller than 0.04 mm is adopted for appropriate availability of a sufficient wipe-off effect. When a groove depth of 0.02 mm is used, a higher wipe-off effect can be obtained without impairing the moisture absorbing function of the moisture absorbing units 22 and 24.

Figure 12A:
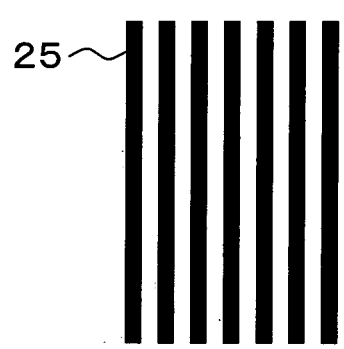
FIGS. 12A to 12D are descriptive views of the groove pattern applicable for this embodiment and improper groove patterns.
Figure 12B:
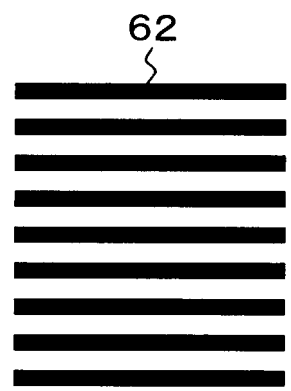
Figure 12C:
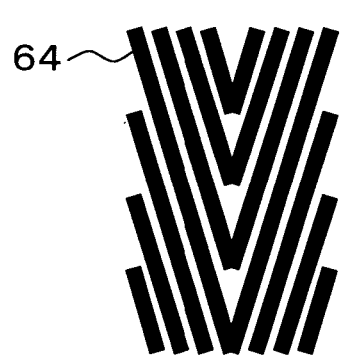
Figure 12D:
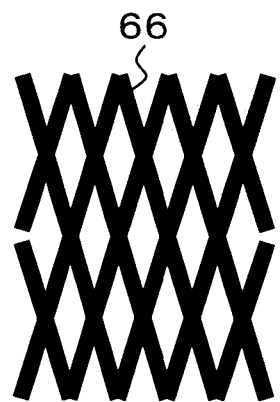
Figure 13A:
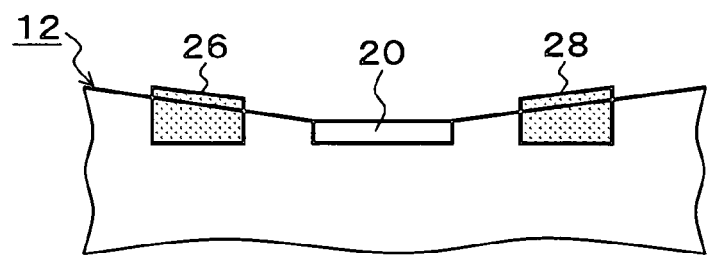
FIGS. 13A and 13B are descriptive views of the frame grounding electrodes arranged before and after the fingerprint sensor of the apparatus main body.
Figure 13B:
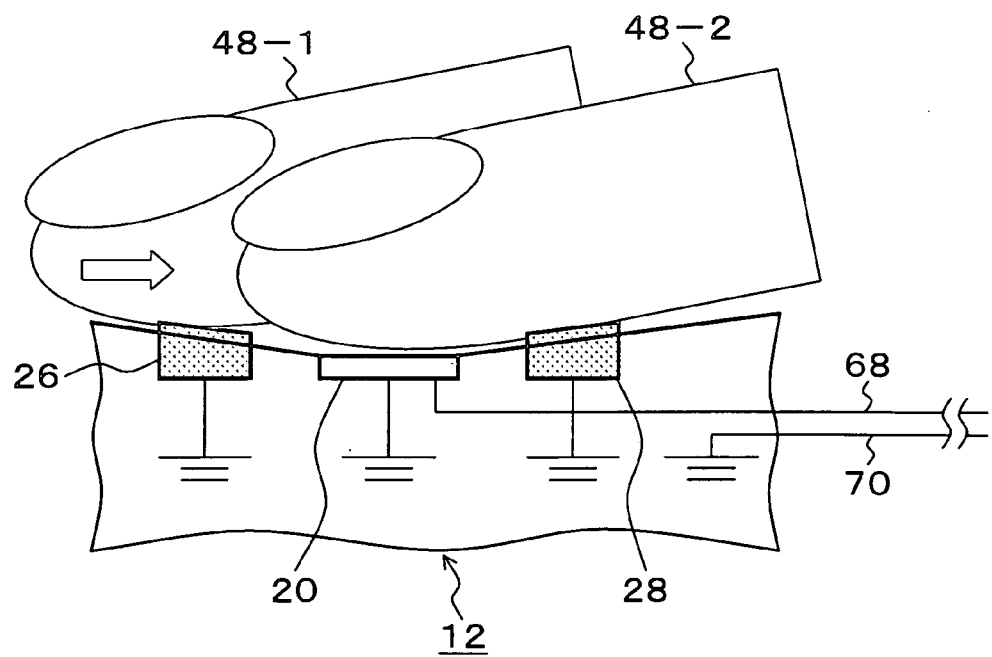

FIGS. 12A to 12D are descriptive views based on a comparison of a groove pattern applicable in this embodiment and an inappropriate groove structure. FIG. 12A illustrates a longitudinal stripe groove pattern 25 corresponding to the groove structure already described above. The low frictional coefficient inhibits distortion of fingerprint, and there is available a sufficient guidance effect permitting smooth displacement of a finger. In the longitudinal stripe groove pattern 25, attention should be given to the fact that, when the groove width is wide, impressions of grooves remaining on the finger cause troubles in reading in a fingerprint image. The groove width should therefore be smaller than 0.2 mm as described above. FIG. 12B represents the transverse stripe groove pattern 62. Since grooves are perpendicular to the direction of finger displacement in the transverse stripe groove pattern 62, it has a high moisture removing function, but the high frictional coefficient causes distortion of the fingerprint. Impossibility to smoothly move the finger corresponds to absence of the guidance function. This pattern may therefore be determined to be a groove structure unsuitable in this embodiment. FIG. 12C shows the V-shaped groove pattern 64 which has a frictional coefficient lower than that of the transverse stripe groove pattern 62, providing an advantage of giving a hardly distorted fingerprint. As compared with the longitudinal stripe groove pattern 25, even with a wide groove width impressions of grooves hardly remain in the finger. A satisfactory guidance effect of moving the finger by aligning the tip of V with the sensor center and further with the direction of finger displacement. The frictional coefficient when moving the finger is higher than that of the longitudinal stripe groove pattern 25. FIG. 12D illustrates the diamond lattice groove pattern (X-shaped groove pattern) 66. The frictional coefficient is lower than that of the transverse strip groove pattern 62, so that the fingerprint is so much hardly deformable. The moisture removing effect is higher than that of the longitudinal stripe groove pattern 25. As compared with the longitudinal stripe groove pattern 25, impressions of grooves hardly remain on the finger even with a wide groove width. However, the frictional coefficient is higher than in the longitudinal stripe groove pattern 25 or the V-shaped groove pattern 64. Among the groove patterns shown in FIGS. 12A to 12D, the most suitable one is the longitudinal stripe groove pattern 25 shown in FIG. 12A. Among the others, the V-shaped groove pattern 64 shown in FIG. 12C and the diamond (X-shaped) groove pattern 66 shown in FIG. 12D are acceptable for this embodiment. FIGS. 13A and 13B are descriptive views of the frame grounding electrodes arranged before and after the fingerprint sensor 20 of the apparatus main body 12 in this embodiment. FIG. 13A is a descriptive view of the positional relationship of the frame grounding electrodes 26 and 28 arranged before and after the fingerprint sensor 20 provided on the apparatus main body. The frame grounding electrodes 26 and 28 play the role of grounding for achieving an agreement of grounding level between the finger and the fingerprint sensor 20 for the purpose of inhibiting occurrence of unnecessary noise such as common-mode noise on the fingerprint image. So that the finger comes into touch with the frame grounding electrode 26 or 28 prior to coming into contact with the fingerprint sensor 20, the frame grounding electrodes 26 and 28 are arranged on a level higher than the detection surface of the fingerprint sensor 20. The frame grounding electrodes 26 and 28 are arranged at two positions before and after the fingerprint sensor 20 so as to ensure that when the finger is in contact with the fingerprint sensor 20, the finger is always in contact with the frame grounding electrode.

FIG. 13(B) illustrates the frame grounding electrodes 26 and 28 in contact with the finger in displacement. The finger 48-1 is at a position just prior to coming into contact with the fingerprint sensor 20. In this state, the finger 48-1 is in touch with the frame grounding electrode 26. Each of the frame grounding electrodes 26 and 28 and the fingerprint sensor 20 is connected to the lane of grounding line 70 connected together with the signal line 68. Therefore, the finger 48-1 and the fingerprint sensor 20 have the same ground level by causing the finger to displace on the fingerprint sensor 20 side while in touch with the frame grounding electrode.

Then, the finger 48-2 represents the position immediately after displacement and contact with the fingerprint sensor 20. At this position, the finger comes in contact with the frame grounding electrode 28 arranged after the fingerprint sensor 20, and the finger and the fingerprint sensor can be brought to the same grounding level.

Figure 14:
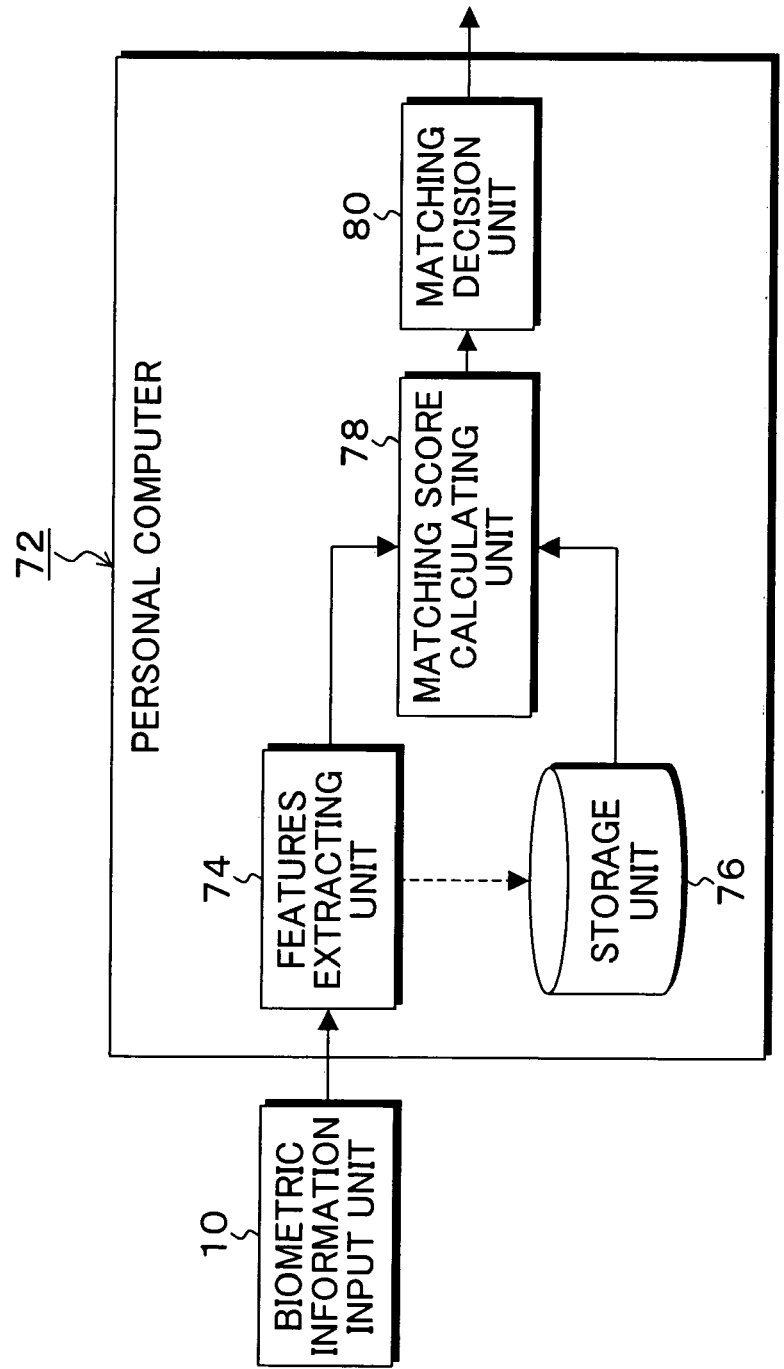
FIG. 14 is a block diagram of the functional configuration of a personal computer connected to the biometric information input apparatus of this embodiment.

FIG. 14 is a block diagram of the functional configuration of the personal computer connected to the biometric information input apparatus of this embodiment. In FIG. 14, the personal computer 72 has a feature extracting unit 74, a storage unit 76, an matching score calculating unit 78 and an decision unit 80 provided therein which are implemented through execution of a program of biometric information authentication processing and the like. The feature extracting unit 74 extracts feature information of fingerprint significant for authentication through image processing of a fingerprint image entered from the biometric information input apparatus 10 for coding. The storage unit 76 stores feature data for registration extracted at the feature extracting unit 74 after reading by the biometric information input apparatus 10 upon registration processing for starting use of the biometric authentication apparatus. The matching score calculating unit 78 calculates the degree of similarity between feature data for registration obtained at a feature extracting unit 74 and feature data for registration of the storage unit 76 regarding fingerprint image information read out from the biometric information input apparatus 10 in a state of use after storage of registered feature data at the storage unit 76. The matching decision unit 80 matches a degree of similarity calculated at the matching score calculating unit 78 with a provided threshold value and determines and outputs the result of matching.

Figure 15:
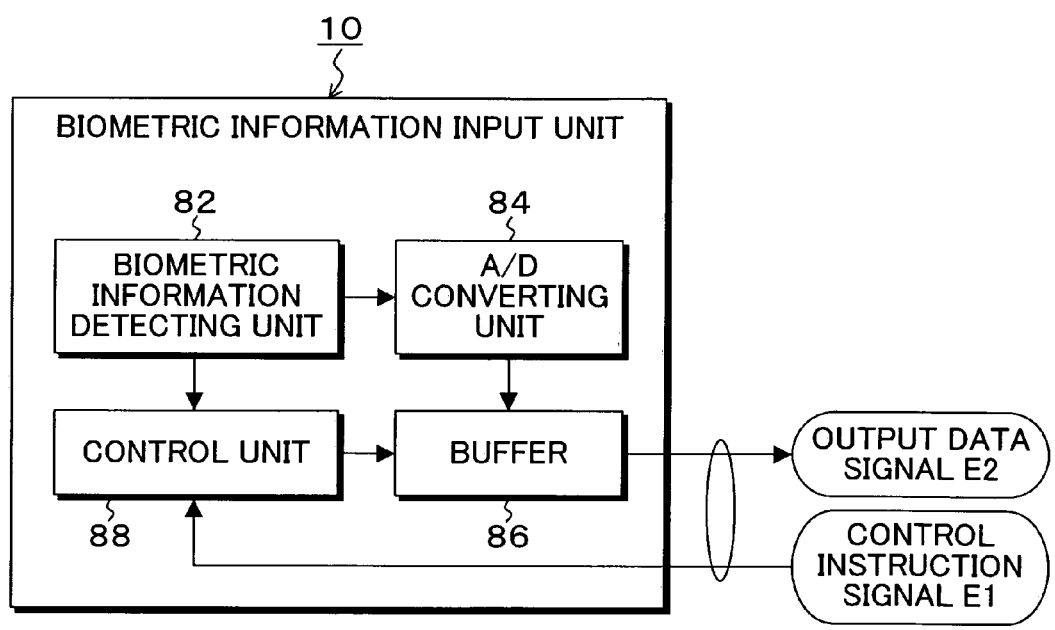
FIG. 15 is a circuit block diagram of the biometric information input apparatus in this embodiment.

FIG. 15 is a circuit block diagram of the biometric information input apparatus 10 in this embodiment. In FIG. 15, the biometric information input apparatus 10 has a biometric information detecting unit 82, an A/D converting unit 84, a buffer 86 and a control unit 88. The biometric information detecting unit 82 is for example a fingerprint sensor 20, reads biometric information in a contact or non-contact manner, and generates one-dimensional or higher biometric information signal. The A/D converting unit 84 digitizes the biometric information signal obtained from the biometric information detecting unit 82, and stores the result in the buffer 86. The control unit 88 receives a control instructing signal E1, controls the biometric information detecting unit 82, and outputs an output data signal E2 from the buffer 86 to outside.

The above-mentioned embodiment has presented a case where a fingerprint image is read in as biometric information. Apart from the above, the present invention is directly applicable for input of appropriate biometric information such as palmprint.

The above-mentioned embodiment has presented a biometric information input apparatus externally connected via a cable connector to a personal computer. It is similarly applicable also to a biometric information input apparatus to be integrally incorporated in an information device such as a personal computer, a cell phone, or a PDA.

The present invention includes appropriate variations without impairing the object and advantages thereof, and is not limited by numerical values shown in the above-mentioned embodiment.

What is claimed is:

1. A biometric information input apparatus comprising:
   a biometric information detecting unit which detects a fingerprint during a relative displacement of the biometric information detecting unit and the living individual's body part
   which is a fingertip; and
   a grooved structure surface part which has a groove structure that includes plural grooves formed parallel to a direction of said relative displacement to guide said living individual's body part along a movement direction, and has a first part and a second part, the detection unit being arranged between the first part and the second part along the movement direction,
   wherein the first part of the groove structure surface part is at least arranged before a finger touches said biometric information detecting unit, and
   said grooves have a groove width smaller than an average ridge pitch, and the groove structure surface generates a capillary phenomenon to absorb a moisture.

2. The biometric information input apparatus according to claim 1, wherein said grooves have a groove width smaller than 0.2 mm.

3. The biometric information input apparatus according to claim 1, wherein said grooves have a groove depth smaller than 0.04 mm.

4. The biometric information input apparatus according to claim 1, further comprising:
   a protecting cap to cover said biometric information detecting unit and said moisture absorbing unit, which are arranged on a main body of the biometric information input apparatus, the protective cap being detachable from the main body, wherein
   said protecting cap is configured to cover said biometric information detecting unit, upon installation thereof on a top side of said main body, and has an angle adjusting structure which increases an inclination angle of a slant surface of said biometric information detecting unit by a prescribed angle, upon installation thereof on a bottom side of said apparatus main body.

5. The biometric information input apparatus according to claim 4, wherein said main body has a shape vertically symmetric, and forms a guide groove which engages with said protecting cap at a side center.

6. The biometric information input apparatus according to claim 1, wherein
   said biometric information detecting unit has frame grounding electrodes that come into contact with the living individual's body part during said relative displacement, the frame grounding electrodes being arranged before and after a detecting surface of the biometric detecting unit, and said frame grounding electrodes being arranged at a position higher than said detecting surface,
   wherein said frame grounding electrodes have a marker shape indicating the direction of displacement of the living individual's body relative to said detecting surface.

* * * * *